United States Patent [19]
Easom et al.

[11] Patent Number: 6,032,456
[45] Date of Patent: Mar. 7, 2000

[54] POWER GENERATING GASIFICATION CYCLE EMPLOYING FIRST AND SECOND HEAT EXCHANGERS

[75] Inventors: Bruce H. Easom, Groton; Leo A. Smolensky, Concord; S. Ronald Wysk, Stow, all of Mass.

[73] Assignee: LSR Technologies, Inc, Acton, Mass.

[21] Appl. No.: 08/927,373

[22] Filed: Sep. 9, 1997

Related U.S. Application Data

[63] Continuation-in-part of application No. 08/418,396, Apr. 7, 1995, abandoned.

[51] Int. Cl.[7] .............................. F02C 3/28; F02B 43/08
[52] U.S. Cl. ...................... 60/39.2; 60/39.12; 60/39.511
[58] Field of Search ........................ 60/39.02, 39.12, 60/39.464, 39.511

[56] References Cited

U.S. PATENT DOCUMENTS

| | | | |
|---|---|---|---|
| 2,701,433 | 2/1955 | Sedille | 60/39.511 |
| 3,020,715 | 2/1962 | Thomsen | 60/39.12 |
| 3,641,763 | 2/1972 | Cole | 60/39.511 |
| 3,759,036 | 9/1973 | White | 60/39.12 |
| 4,261,166 | 4/1981 | Mayrhofer | 60/39.12 |
| 4,261,167 | 4/1981 | Paull et al. | 60/39.12 |
| 4,354,347 | 10/1982 | Tomlinson et al. . | |
| 4,409,761 | 10/1983 | Bechtel . | |
| 4,476,674 | 10/1984 | Berman . | |
| 4,546,603 | 10/1985 | Arakawa et al. | 60/39.12 |
| 4,569,197 | 2/1986 | Adrian et al. | 60/39.464 |
| 4,651,520 | 3/1987 | Giertz et al. | 60/39.464 |
| 4,676,063 | 6/1987 | Goebel et al. | 60/39.12 |
| 4,697,415 | 10/1987 | Schiffers | 60/39.12 |
| 4,723,407 | 2/1988 | Goebel et al. | 60/39.12 |
| 4,833,877 | 5/1989 | Ahland et al. | 60/39.12 |
| 4,841,722 | 6/1989 | Bjorge . | |
| 4,875,436 | 10/1989 | Smith et al. . | |
| 4,881,366 | 11/1989 | Nurse | 60/39.12 |
| 4,946,477 | 8/1990 | Perka et al. . | |
| 5,069,685 | 12/1991 | Bissett et al. | 60/39.12 |
| 5,078,752 | 1/1992 | Mach et al. . | |
| 5,117,623 | 6/1992 | Arundale . | |
| 5,165,239 | 11/1992 | Bechtel et al. . | |
| 5,319,934 | 6/1994 | Parker, III et al. . | |

FOREIGN PATENT DOCUMENTS

| | | | |
|---|---|---|---|
| 1812366 | 6/1970 | Germany | 60/39.511 |

OTHER PUBLICATIONS

Fjellerup "Optimal Processing Conditions for a Dolomite Cracker for Cracking of Tar from Gasification of Biomass Fuels", Risoe National Lab Report Number NEI–DK–250. Abstract, Aug. 1989.

Document Control Sheet; Publication Date: Oct. 1991; Authors: Dr. Baumgartel, G, Dr. Muller, R, Dr. Schiffers, U.

*Primary Examiner*—Ted Kim
*Attorney, Agent, or Firm*—Baker & McKenzie

[57] ABSTRACT

An improved combined power generation cycle has been provided for electric power generation from gasified solid fuel such as coal or biomass. The power cycle provided by the present invention does not require the use of high-temperature particulate control systems or wet clean-up systems. A high-temperature high-pressure gas stream is first cooled in a heat-transfer system and then cooled again by any one of a variety of methods before the particulate solids and hazardous air pollutants are removed in a low-temperature dry solids collector. Then, the clean gas is reheated in the same heat-transfer system and is ready for use in power generation. Net plant efficiencies can be improved by injecting water or steam upstream of the topping cycle power generating means.

8 Claims, 14 Drawing Sheets

POWER GENERATING GASIFICATION CYCLE EMPLOYING FIRST AND SECOND HEAT EXCHANGERS

This application is a continuation-in-part of application Ser. No. 08/418,396, filed Apr. 7, 1995 abandoned.

BACKGROUND OF THE INVENTION

1. Field of the Invention

This invention relates generally to the generation of power from gasified solid fuels such as coal or biomass. More particularly, the present invention relates to an improved power generation cycle for gasified solid fuels that eliminates the need for a high-temperature particulate control system or a wet clean-up scrubbing system.

2. Description of the Related Art

Advanced solid fuel-based power generating cycles include advanced pulverized coal combustion with both direct cycles including integrated gasification combined cycles (IGCC), second-generation or advanced pressurized fluidized-bed combustion (APFBC) cycles, gasification molten carbonate fuel cell (MCFC) cycles, etc. as well as indirect cycles. While all these cycles have the potential to provide cost effective and environmentally benign power generation for needs of utility and industrial sectors, all of these cycles suffer from one common deficiency.

Specifically, all of these cycles produce high-temperature gas streams with unacceptably high particulate and hazardous air pollutants (HAPS) concentrations. In order to utilize the above solid-fuel cycles and meet the environmental standards set by federal and local regulatory bodies, significant advances must be made in the art of removing particulates and HAPs from the high temperature gas streams because both primary methods of removing the particulates and HAPs that are currently available, i.e. (1) currently available high temperature particulate control technology and (2) wet scrubbing systems, are unacceptable for the reasons stated below.

By way of background, APFBC and IGCC systems utilize gas turbines to generate power and therefore any particulates should be removed from the combustion gas upstream of the turbine because excessive levels of particulates in the combustion gas stream will engage the turbine, cause erosion of the turbine blades and result in particulate deposits in the turbine. The result is physical damage to the turbine blades and reduced efficiency of the turbine. Accordingly, the particulates must be removed from the contaminated combustion gas upstream of the turbine in order to protect the turbine and provide acceptable turbine life and efficiency.

Similarly, in an MCFC system, it is important to remove the particulates from the combustion gas upstream of fuel cell because particulates in the combustion gas stream will result in particulate deposits on the small pores of the support structure of the anode which will eventually lead to plugging of these pores. Any plugging of the pores of the support structure will not only damage the support structure but will also result in inefficient operation of the cell.

In solid fuel power generation cycles, high temperature combustion gas streams are required to achieve high cycle efficiency. These temperatures typically should exceed 1100° C. in direct and 1370° C. in indirect cycles. However, at the present time, the ability to operate high-temperature particulate control systems to remove particulates from the high temperature gas streams at these temperatures is quite problematic because the high-temperature particulate control technology currently available for advanced gasification cycles is expensive and unreliable.

Further, there is an additional factor making the high-temperature particulate control unattractive. High-temperature particulate collectors do not usually eliminate the need for additional air toxics control devices because most of the hazardous air pollutants (HAPs) have relatively low boiling points and cannot be effectively controlled by high-temperature particulate collectors.

The problems associated with high-temperature particulate control are not effectively circumvented in a power generating gasification cycle using a wet clean-up process. In a wet clean-up process, the high-temperature gas stream is cooled in a heat recuperator or regenerator and then cleaned with a wet scrubbing system. However, wet scrubbing systems require the injection of large amounts of cleaning liquid (normally water) into the gas stream. Because the added water cools the gas to a temperature below the water condensation temperature, the clean gas therefore contains substantial amounts of moisture by the time it is returned to the heat recuperator or regenerator which results in a very inefficient cycle. Further, wet clean-up systems have high capital cost requirements.

Accordingly, it would be highly desirable to provide a new power generating gasification cycle that could avoid the following problematic solutions taught by the prior art, namely: (1) a high-temperature particulate control systems, and (2) a wet clean-up systems. The present invention provides a solution with a combined power generating gasification cycle that does not resort to the prior art designs discussed above and which further provides a power generation cycle with low space and cost requirements, universal applications, low emission levels and high cycle efficiency.

SUMMARY OF THE INVENTION

The advanced gasification cycle of the present invention provides an improved heat management method that allows particles and HAPs to be removed from contaminated high-temperature gas at the most favorable conditions and upstream of the power generation equipment.

Specifically, the removal of solid particles and HAPs from a particulate laden high-temperature high-pressure gas stream can be accomplished by first lowering the temperature of the gas in accordance with the following steps. First, a high-temperature fuel gas is produced from the solid fuel, steam and air or oxygen in a gasifier. Then, the particulate laden fuel gas is cooled in a first heat-transfer system down to a first temperature that exceeds the temperature at which liquid water forms in the fuel gas. A second cooling step is then performed to lower the temperature of the fuel gas to a second temperature that exceeds the temperature at which liquid water forms in the fuel gas. Then, the now twice-cooled gas is introduced to any one of a number of low-temperature dry solids collectors where the particulate solid matter is removed as well as the HAPs which condense on the particulate surfaces. During the step of removing the particulate solid matter and HAPs, the temperature of the fuel gas is maintained above the temperature at which liquid water forms in the fuel gas. Finally, after exiting the low-temperature dry solids collector, the now-cleaned gas is returned to the first heat-transfer system where it absorbs heat from the high-temperature contaminated gas. The resulting gas flow is a high-temperature clean gas from which electrical or mechanical power may be generated.

It can be seen from the above summary of the advanced gasification cycle of the present invention that the fuel gas produced in the gasification step is not allowed to fall below the temperature at which liquid gas forms in the fuel gas in any step of the process. By insuring that no liquid water forms in the fuel gas, the highest efficiency can be achieved from the power cycle.

While many variations on the basic advanced gasification cycle of the present invention are available, one common feature of the present invention is the first heat-transfer system which transfers heat from the higher-temperature contaminated gas to the lower-temperature clean gas which results in a high-temperature clean gas flow for use with a turbine or fuel cell. The first heat-transfer system can be arranged as a heat exchanger or heat regenerator, and several steps can be made to prevent the first heat-transfer system from fouling or plugging caused by the particulates carried in the high temperature gas stream.

Another common feature is the second cooling step or second heat exchange system where the contaminated gas is further cooled down to a temperature exceeding the temperature at which liquid water forms in the fuel gas, i.e., the water condensation temperature at the operating pressure. This second cooling step may be accomplished by injecting quench water into the flow stream or by utilizing an auxiliary heat exchanger which employs cooling water or another coolant. The second cooling step cools the gas to a sufficiently low level for solids removal and also creates a sufficient temperature differential across the first heat-transfer system. However, the second cooling step avoids the inefficiencies of wet scrubbing systems by not reducing the temperature of the gas to a level below the water condensation temperature.

The method of removing solids from the cooled stream can also vary widely. Other low-temperature dry solids collectors known in the art may be employed in addition to electrostatic precipitators and baghouses. However, regardless of the pollutant removal system selected, the temperature of the fuel gas is maintained above the temperature at which liquid water forms in the fuel gas during the step of removing the particulate solid matter and HAPs.

Other variations on the basic gasification cycle include preheating compressed cooling water in the auxiliary heat exchanger and in the bottoming cycle, and injecting this water into the compressed air flow introduced to the gasifier. This step reduces the amount of heat rejected by the topping cycle and improves the net plant efficiency.

It is therefore an object of the present invention to provide an improved power generating gasification cycle that eliminates the need for a high-temperature particulate control system.

Another object of the present invention is to provide an improved power generating gasification cycle that eliminates the need for a wet clean-up system.

Yet another object of the present invention is to provide an improved power generating gasification cycle that features higher cycle efficiencies because liquid water is not removed from the fuel gas during the cycle.

A related object of the present invention is to provide an improved power generating gasification cycle that employs components that are either commercially available or require only relatively minor modifications.

Still another object of the present invention is to provide an improved power generating gasification cycle that has low space and low cost requirements.

Yet another object of the present invention is to provide an improved power generating gasification cycle that features low emission levels.

Another object of the present invention is to provide an improved power generating gasification cycle that may be easily incorporated into existing systems.

Other objects and advantages of the present invention will become apparent upon reading the following detailed description of the drawings and appended claims, and upon reference to the accompanying drawings.

BRIEF DESCRIPTION OF THE DRAWINGS

The invention is illustrated more or less diagrammatically in the accompanying drawings wherein.

It should be noted that the drawings are not necessarily to scale and that the embodiments are illustrated by graphic symbols. In certain instances, details which are not necessary for an understanding of the present invention or which were under other details difficult to perceive have been omitted. It should be understood, of course, that the invention is not necessarily limited to the particular methods and designs illustrated herein.

DESCRIPTION OF THE PREFERRED EMBODIMENTS

Like reference numerals will be used to refer to like or similar components from figure to figure in the following description of the drawings.

The present invention is best understood upon consideration of currently available combined power generating gasification cycles. Specifically, these types of power generating cycles require some sort of dry- or wet-type emission controls to remove particulates, HAPs and other matters from the contaminated gas streams. The currently available emission control systems for advanced gasification cycles include high-temperature particulate control technology, which as noted above, is unreliable, expensive and cannot be used for effective HAP control. Wet clean-up systems, such as wet scrubbers, have also been used for advanced power generating gasification cycles but have been found to be expensive and inefficient.

Accordingly, the present invention provides a new power generating gasification cycle which avoids high-temperature particulate control systems and wet clean-up systems. The system of the present invention also features low space and cost requirements, low emission levels and high cycle efficiency. Further, the system of the present invention can be fabricated from readily available components and further can be integrated into existing systems.

Figure 1:
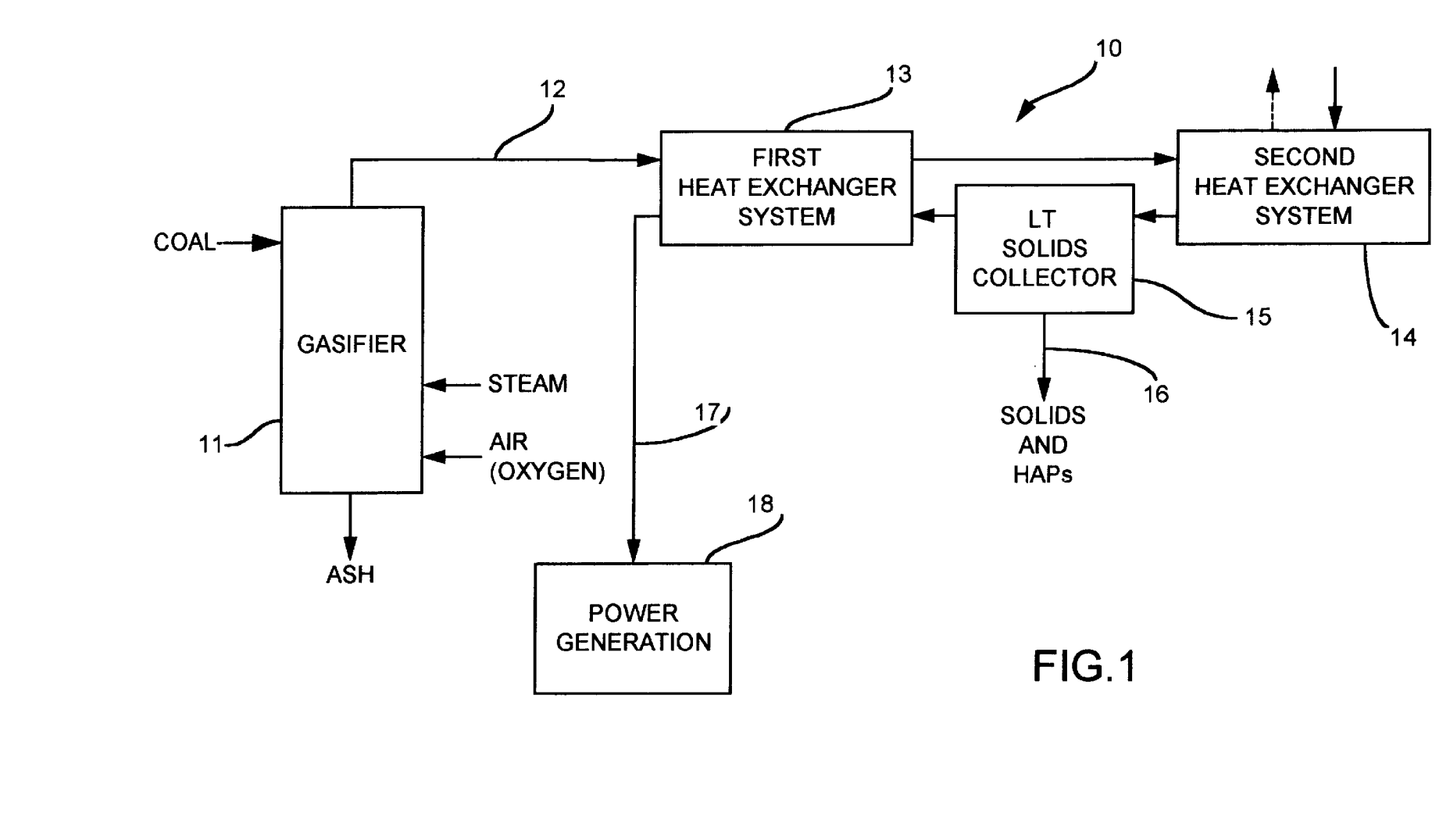
FIG. 1 is a schematic diagram of a power generating gasification cycle as practiced in accordance with the present invention.

Turning to FIG. 1, a cycle 10 designed in accordance with the present invention is provided. Coal, steam and air or oxygen are all combined in the gasifier 11 to produce a high temperature fuel gas stream 12. The gas stream 12 contains unacceptably high levels of particulates and HAPs. To remove the particulates and HAPs, the gas stream 12 is first cooled in the heat exchange system 13 before it is cooled again in a second heat exchange system 14. As shown below, the second heat exchange system may involve the injection of quench water or a low temperature heat exchanger. Other heat exchange systems will be apparent to those skilled in the art. In any event, the fuel gas 12 remains at a temperature greater than the temperature at which liquid water forms in the fuel gas, i.e., the water condensation temperature, when the fuel gas is treated in the first and second heat exchange system and prior to its introduction into the low temperature solids collector 15. The solids and condensate containing the HAPs are removed at 16. During this pollutant removal step, the temperature of the fuel gas remains above the temperature at which liquid water forms in the fuel gas. The now-clean gas is then re-heated by the dirty gas in the heat exchange system 13 to produce a high temperature clean gas at 17 from which power is generated at 18.

As shown below, the first heat exchange system may include a heat exchanger, heat regenerator or other suitable heat exchange means. A variety of low temperature solids collectors are also available which will also remove the HAPs due to condensation of the HAPs on the particulate solid surfaces. Further, as noted below, power may be generated from the clean fuel gas 17 with a combination of combustors and turbines, a combination of expanders and fuel cells or other power generation means that will be apparent to those skilled in the art.

Figure 2:
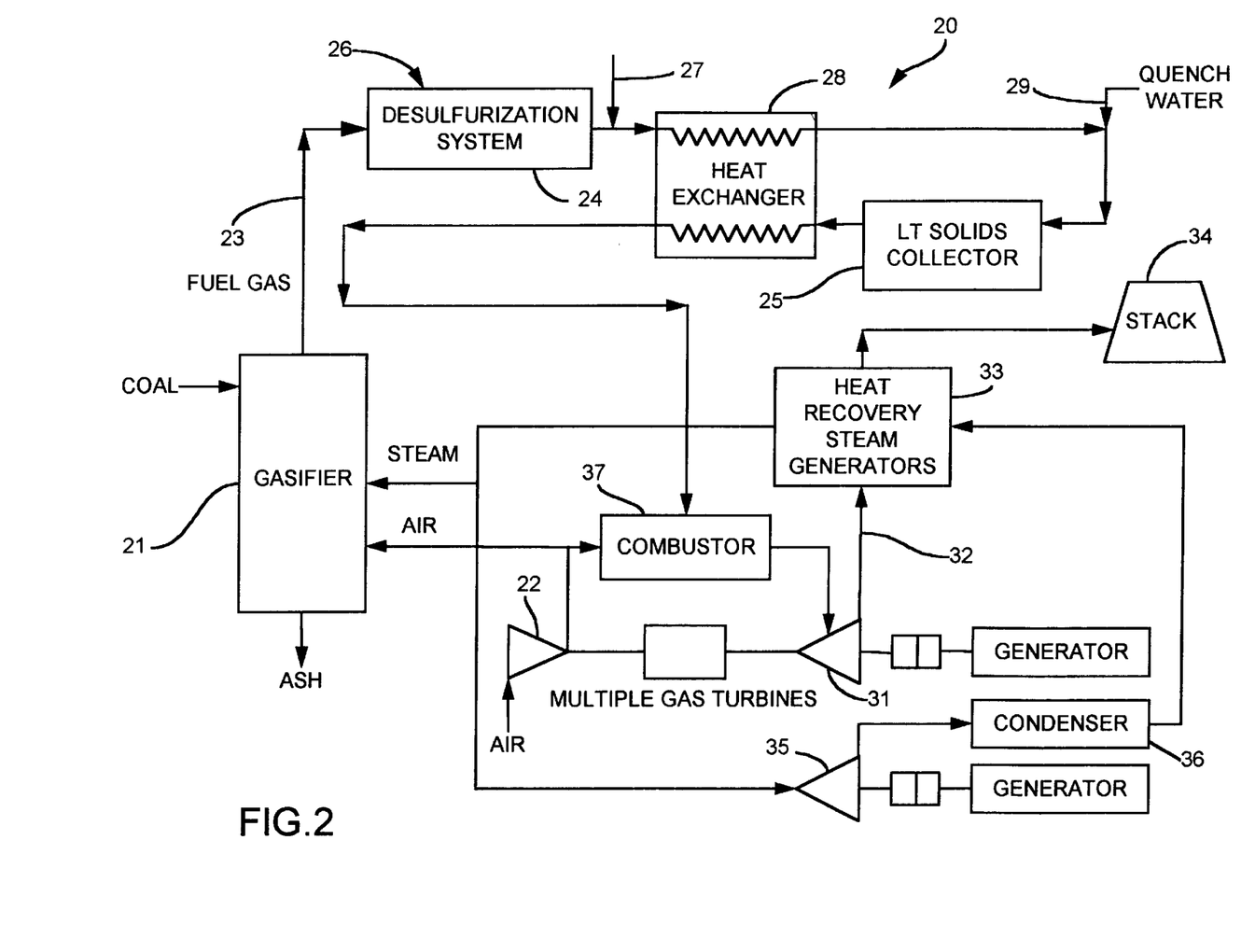
FIG. 2 is a schematic diagram of an alternative power generating gasification cycle as practiced in accordance with the present invention.

Turning to FIG. 2, a schematic diagram of another improved power generating cycle 20 employing the basic principles of the integrated gasification combined cycle (IGCC) is illustrated. A coal gasifier 21 is provided which essentially converts coal into a gaseous fuel by reaction of the coal, steam and oxygen or air compressed by the compressor 22. The resulting fuel gas 23 is normally contaminated with solid and gaseous contaminants which are removed by the desulfurization system 24 and the low-temperature dry solids collector 25. A sorbent may be added to the desulfurization system 24 at 26. A tar cracking catalyst may be added to the system at 27. The gas is then introduced to the first heat exchanger 28 where it is cooled initially before being cooled again by the injection of quench water at 29. The cooled gas is removed of particulate solids and HAPs at 25 before it is reheated in the heat exchanger 28 and introduced to the combustor 37 where it is combined with air or oxygen from the air compressor 22 and introduced to the gas turbine 31. At all times during the treatment of the fuel gas prior to reheating of the fuel gas in heat exchanger 28, the fuel gas remains at a temperature exceeding the temperature at which liquid water forms in the fuel gas. Heat recovered from the gas turbine exhaust 32 is used to generate steam at the heat recovery steam generator (HRSG) 33 which provides steam for the gasifier 21 and for the steam turbine 35. Steam from the steam turbine 35 is condensed in the condenser 36 before being reintroduced into the HRSG 33 where it is used to generate additional steam. After the turbine exhaust 32 passes through the HRSG 33, it is directed to the stack 34. Of course, the desulfurization system 24 and low-temperature dry solids collector 25 in the power generating cycle 20 may be selected from one of many commercially available technologies. For example, electrostatic precipitators, baghouse filters or barrier filters can be used as low-temperature dry solids collectors.

Figure 3:
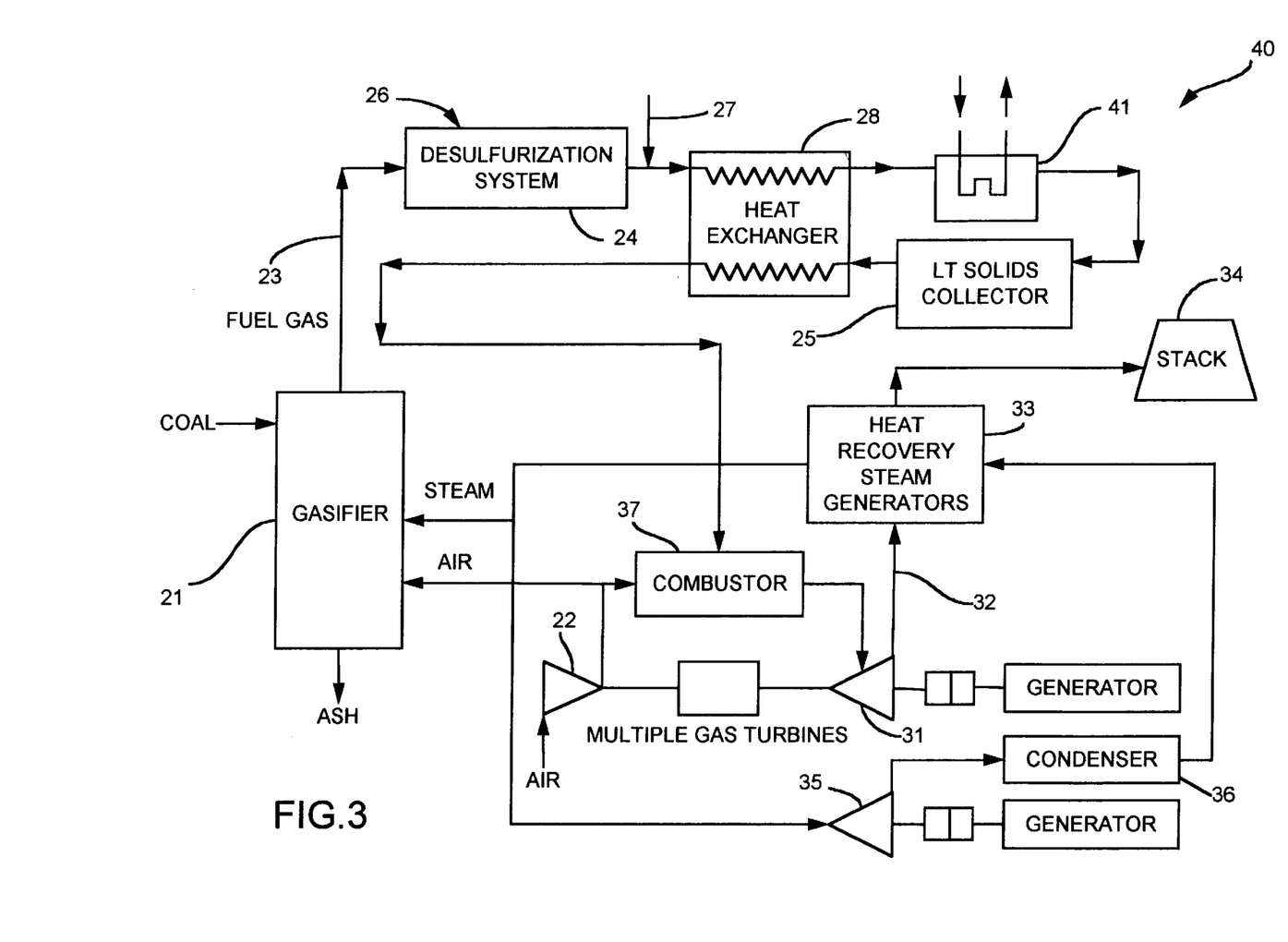
FIG. 3 is a schematic diagram of an alternative power generating gasification cycle as practiced in accordance with the present invention.

Turning now to FIG. 3, the system 40 uses the same components as the system 20 as shown in FIG. 2 but the quench water 29 (see FIG. 2) has been removed and the low-temperature heat exchanger 41 has been placed between the heat exchanger 28 and low-temperature dry solids collector 25. At all times, during the operation of this system, the fuel gas remains above the temperature at which liquid water forms in the system.

Figure 4:
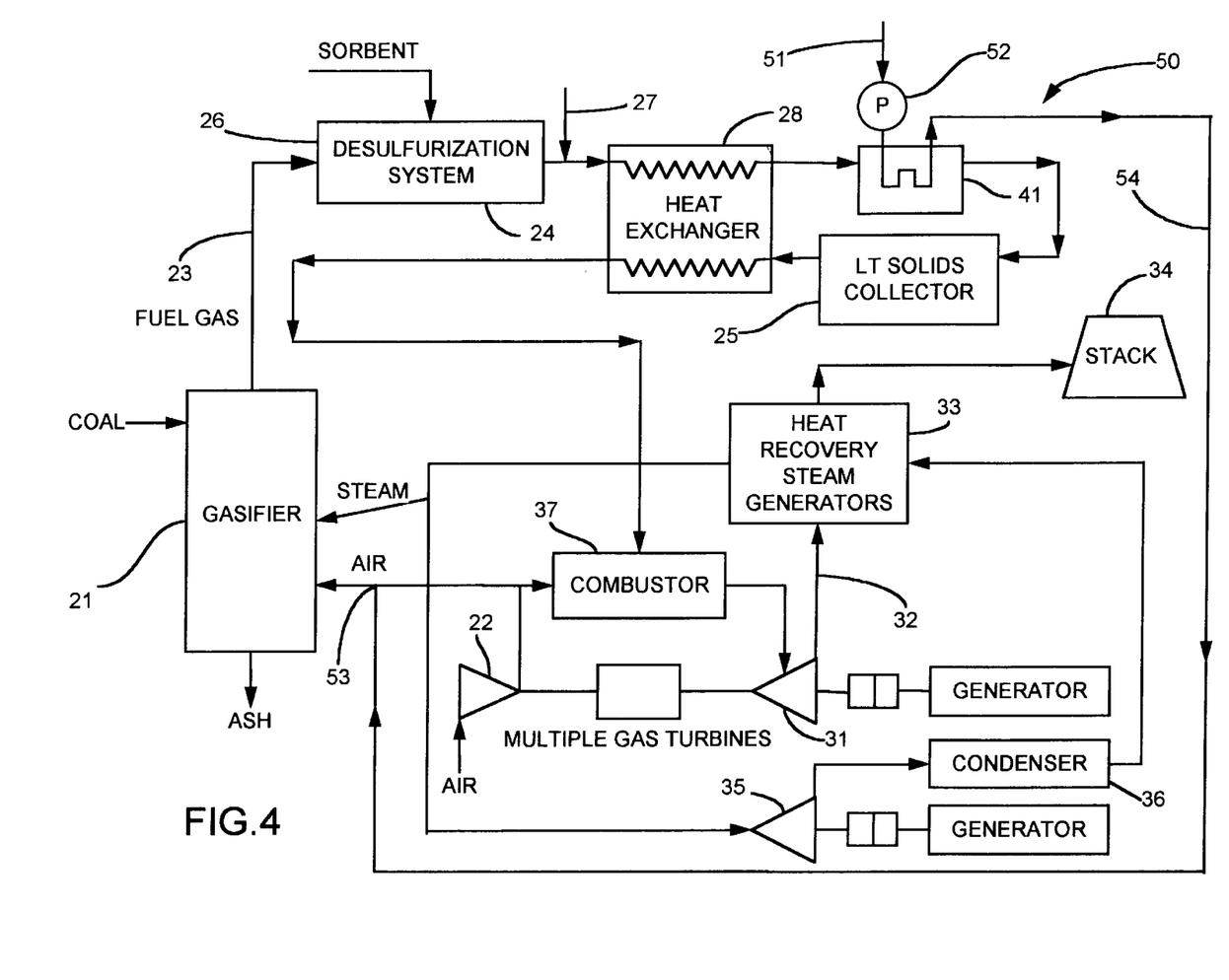
FIG. 4 is a schematic diagram of an alternative power generating gasification cycle as practiced in accordance with the present invention.

Turning to FIG. 4, the system 50 uses the same components as the system 20 shown in FIG. 2 but the low-temperature heat exchanger 41 employs a compressed fluid 51 as a coolant. The compressed fluid 51 is compressed by the pump 52 and, after preheating in the low-temperature heat exchanger 41, the fluid is then injected in the compressed air line at 53. The conduit 54 connects the low-temperature heat exchanger 41 with the compressed air line 53.

Figure 5:
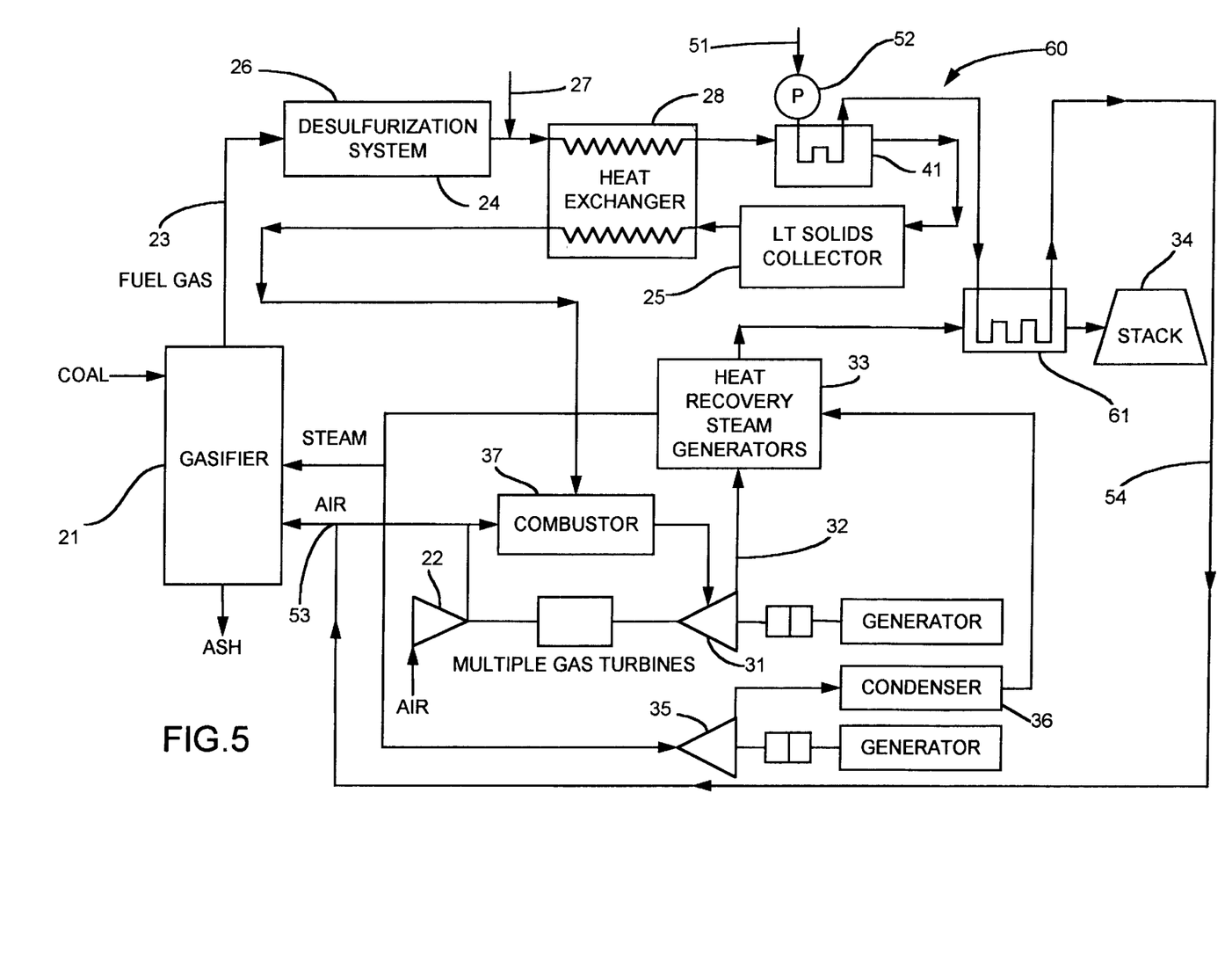
FIG. 5 is a schematic diagram of an alternative power generating gasification cycle as practiced in accordance with the present invention.

Turning to FIG. 5, the system 60 uses the same components as the system 50 shown in FIG. 4 but fluid 51 leaving the low temperature heat exchanger 41 is heated further in the economizer 61. The economizer 61 is installed in the bottoming cycle and utilizes the energy of the exhaust gases from the HRSG 33 to heat the fluid 51. Water can be used as the fluid 51; after heating in the low-temperature heat exchanger 41 and economizer 61, the fluid 51 can be injected in the compressed air line at 53 in the form of sub-cooled water, saturated water, steam or steam/water mixture.

Figure 6:
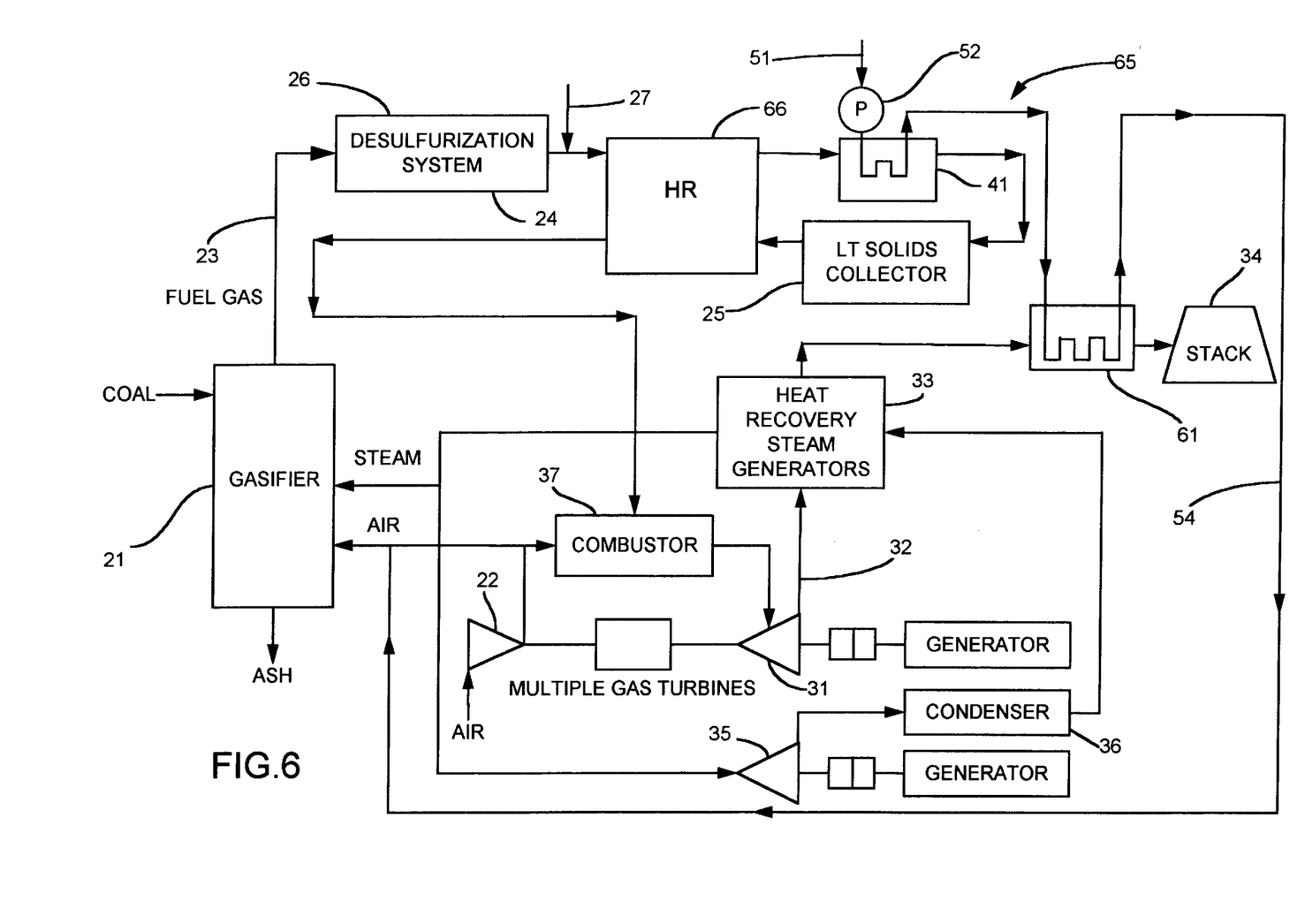
FIG. 6 is a schematic diagram of an alternative power generating gasification cycle as practiced in accordance with the present invention.

Turning to FIG. 6, the system 65 uses the same components as the system 60 shown in FIG. 5 but the heat exchanger 28 has been replaced with the heat regenerator (HR) 66.

Figure 7:
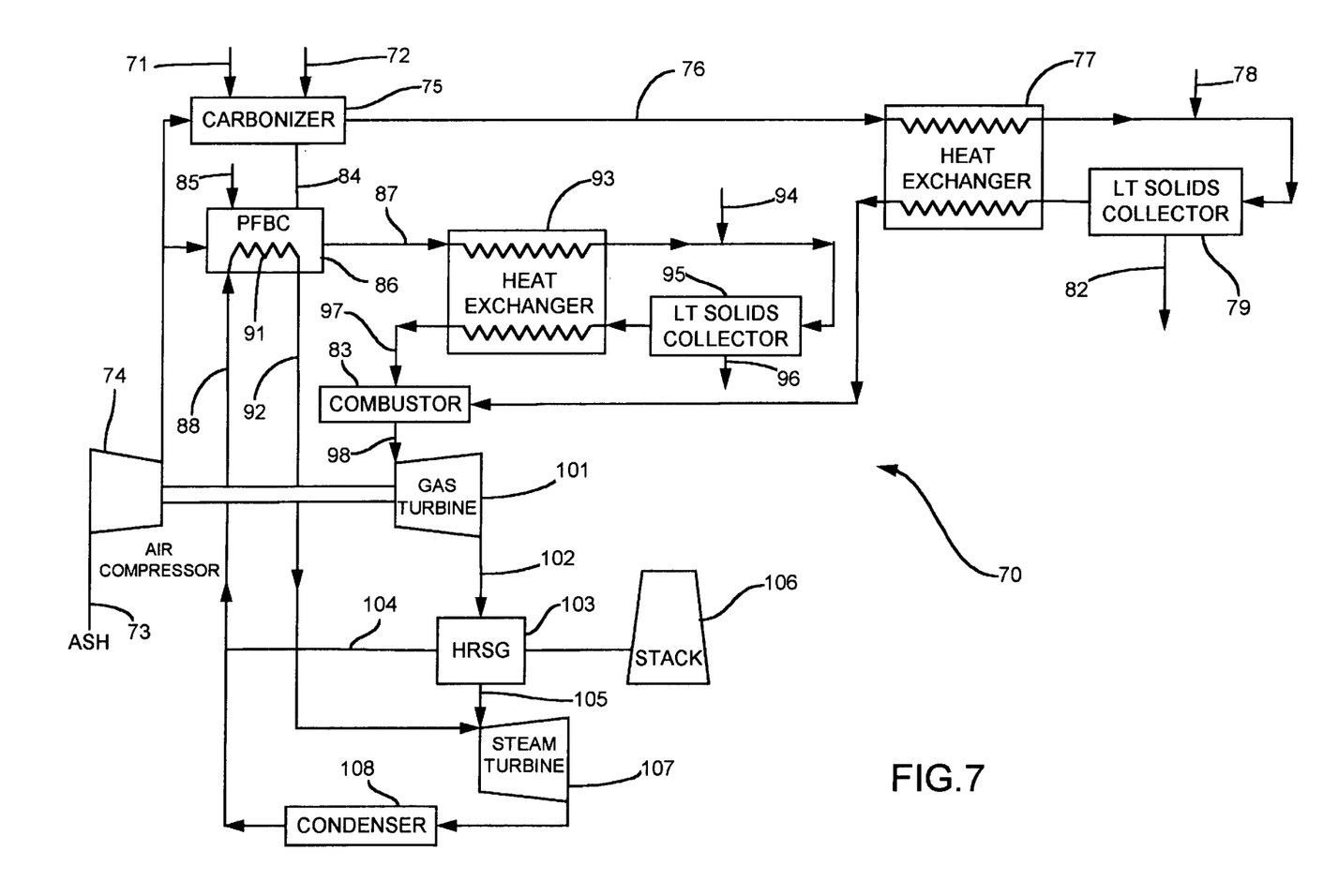
FIG. 7 is a schematic diagram of an alternative power generating gasification cycle as practiced in accordance with the present invention.

Turning to FIG. 7, a schematic diagram of the new improved power generating cycle 70 employing the basic principles of the advanced pressurized fluidized-bed combustion (APFBC) is illustrated. In this case, coal 71, sorbent 72 and air 73 compressed in the compressor 74 are injected into the carbonizer 75, where the coal is carbonized (partially gasified) producing fuel gas 76. The fuel gas 76 is introduced to the heat exchanger 77 for cooling. Additional cooling is provided by the quench water 78 before the cooled contaminated fuel gas stream enters the low-temperature dry solids collector 79 where particulates and HAPs are removed from the fuel gas stream at 82. The cleaned and cooled fuel gas stream is then reheated in the heat exchanger 77 before being injected into the combustor 83.

Char 84 from the carbonizer 75, compressed air 73 and sorbent 85 are introduced to the pressurized fluidized-bed combustor (PFBC) 86. The char 84 is combusted in the PFBC 86, releasing the energy utilized to heat vitiated air 87 and feedwater 88 from the bottoming cycle. The feedwater 88 is heated in the fluidized bed heat exchanger 91 incorporated into the PFBC 86 and produces steam 92 directed to the steam turbine 107.

The vitiated air 87 is cooled in the heat exchanger 93 and then by the quench water 94, before it is introduced to the low-temperature dry solids collector 95 which removes solids and HAPs at 96 from the contaminated vitiated air. After reheating in the heat exchanger 93, clean high-temperature vitiated air 97 is introduced to the combustor 83. Both the fuel gas 76 and vitiated air 87, before being introduced to the solids collectors 79 and 95, are cooled down to temperatures which are low enough to avoid problems of high-temperature particulate control systems but high enough to avoid the formation of liquid water in the gas and air. During treatment of both the fuel gas 76 and vitiated air 87 in the solids collectors 79 and 95, the temperature of the fuel gas 76 and vitiated air 87 remain at a temperature exceeding the temperature at which liquid water forms in the fuel gas 76 and vitiated air 87.

Fuel gas is combusted in the combustor 83 in the presence of vitiated air 97. Flue gas 98 leaving the combustor 83 is introduced to the gas turbine 101 to generate power. The gas turbine exhaust gas 102 is introduced to the heat recovery steam generator (HRSG) 103, where it transfers the heat to water 104 and generates steam 105, before it is directed to the stack 106. Steam 105 is introduced to the steam turbine 107 to generate power, and steam from the steam turbine 107 is condensed in the condenser 108 providing the feed water 88.

Figure 8:
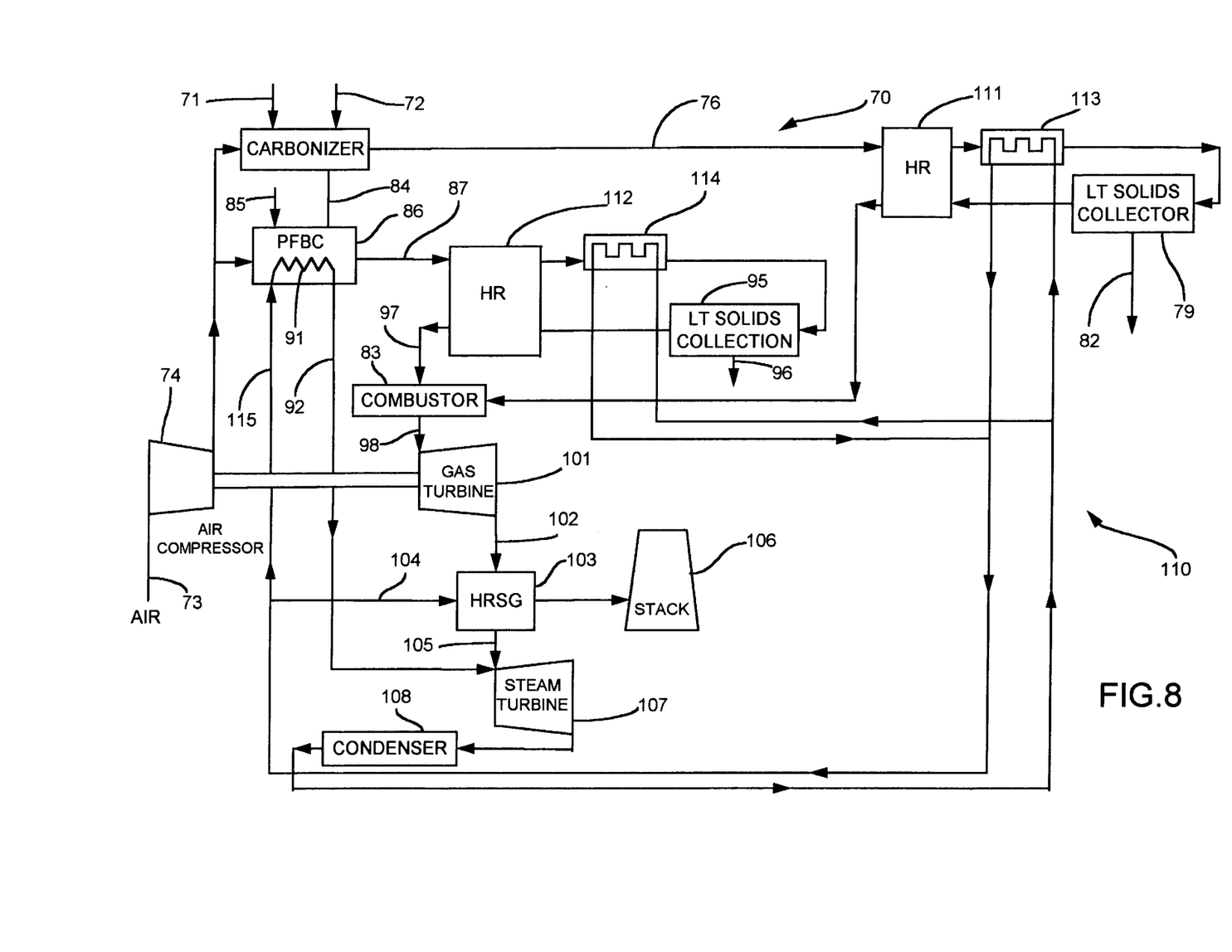
FIG. 8 is a schematic diagram of an alternative power generating gasification cycle as practiced in accordance with the present invention.

Turning to FIG. 8, the system 110 uses the same components as the system 70 as shown in FIG. 7 but a heat regenerator 111 has been used instead of the heat exchanger 77 (see FIG. 7), and a heat regenerator 112 has been used instead of the heat exchanger 93 (see FIG. 7). Further, the quench water 78 (see FIG. 7) has been removed and the low-temperature heat exchanger 113 has been placed between the heat regenerator 111 and the solids collector 79. Similarly, the quench water 94 has also been removed and the low-temperature heat exchanger 114 has been placed between the heat regenerator 112 and the solids collector 95. Both low-temperature heat exchangers 113 and 114 employ feedwater 115 as a cooling medium.

Figure 9:
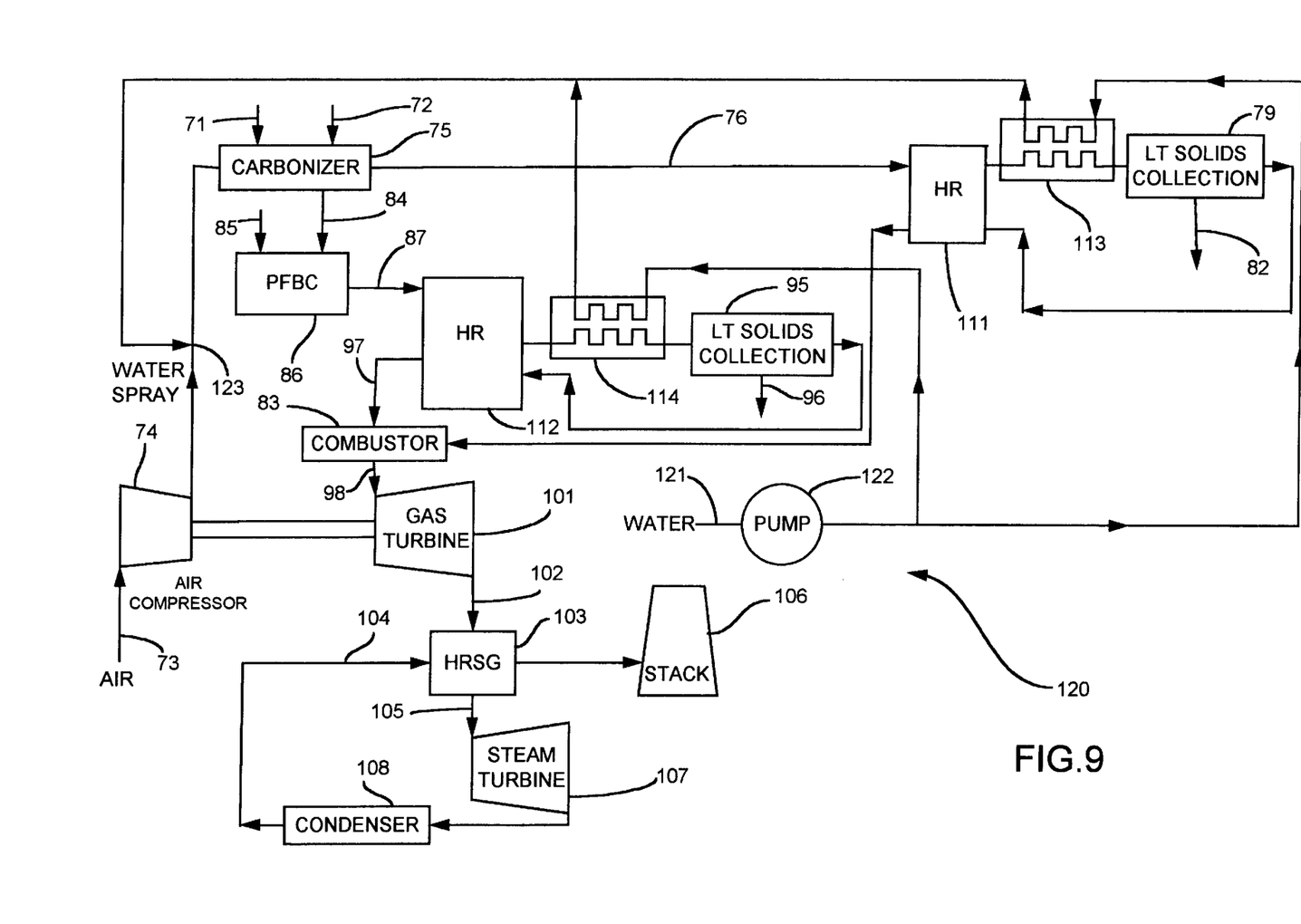
FIG. 9 is a schematic diagram of an alternative power generating gasification cycle as practiced in accordance with the present invention.

Turning to FIG. 9, the system 120 uses the same components as the system 110 as shown in FIG. 8, but the water 121 compressed by the pump 122 is employed as a cooling medium for the low-temperature heat exchangers 113, 114 instead of the feedwater 115 (see FIG. 8). After leaving the heat exchangers 113, 114, the water flow is injected in the compressed air line at 123 between the air compressor 74, from one side, and the carbonizer 75 and PFBC 86, from the other side.

Figure 10:
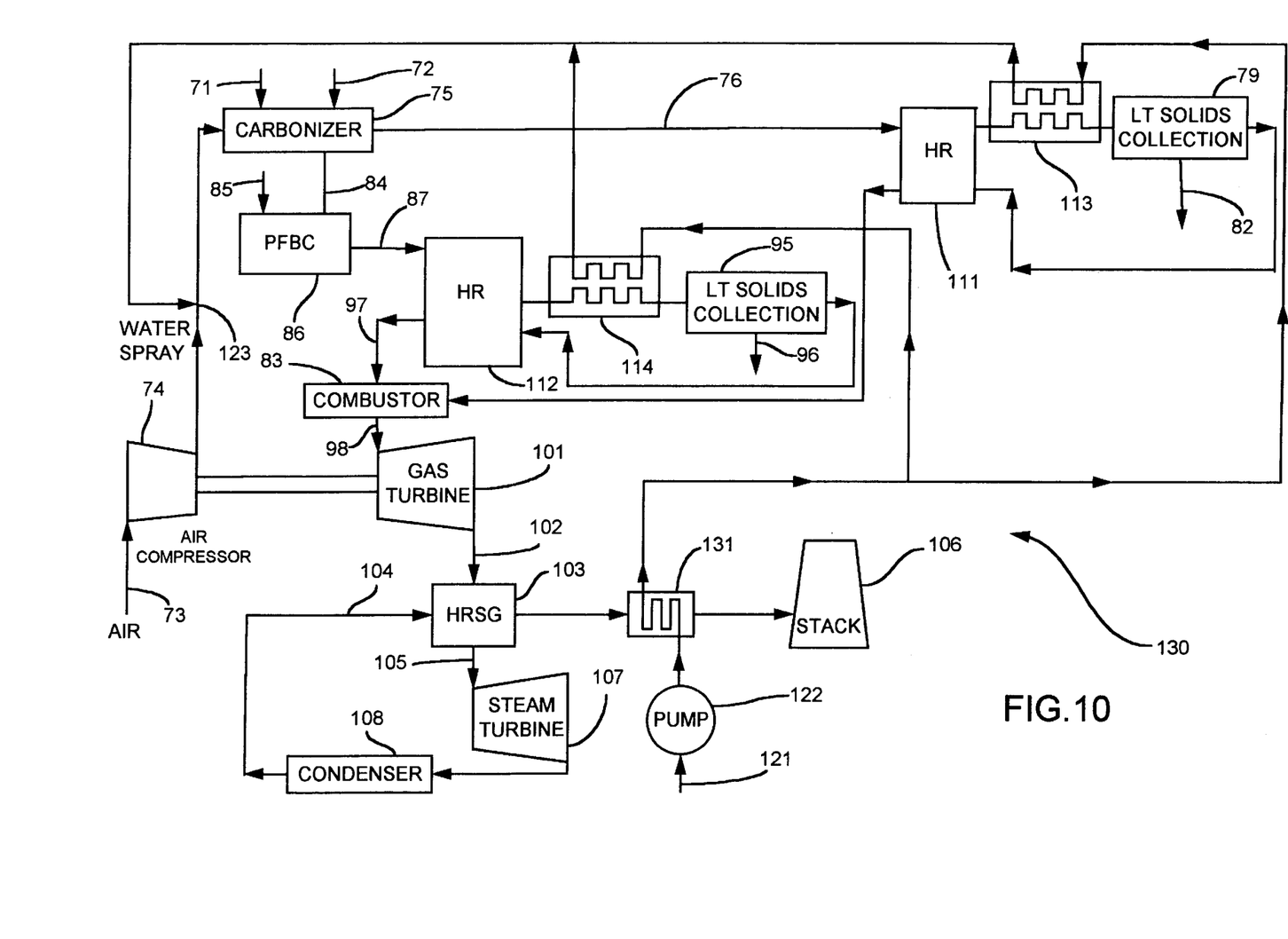
FIG. 10 is a schematic diagram of an alternative power generating gasification cycle as practiced in accordance with the present invention.

Turning to FIG. 10, the system 130 uses the same components as the system 120 as shown in FIG. 9, but the water 121 is preheated in the economizer 131 before it is introduced to low-temperature heat exchangers 113, 114. The economizer 131 is installed in the bottoming cycle and utilizes the energy of flue gases 102 to heat the water 121, before the flue gases 102 are directed to the stack 106.

Figure 11:
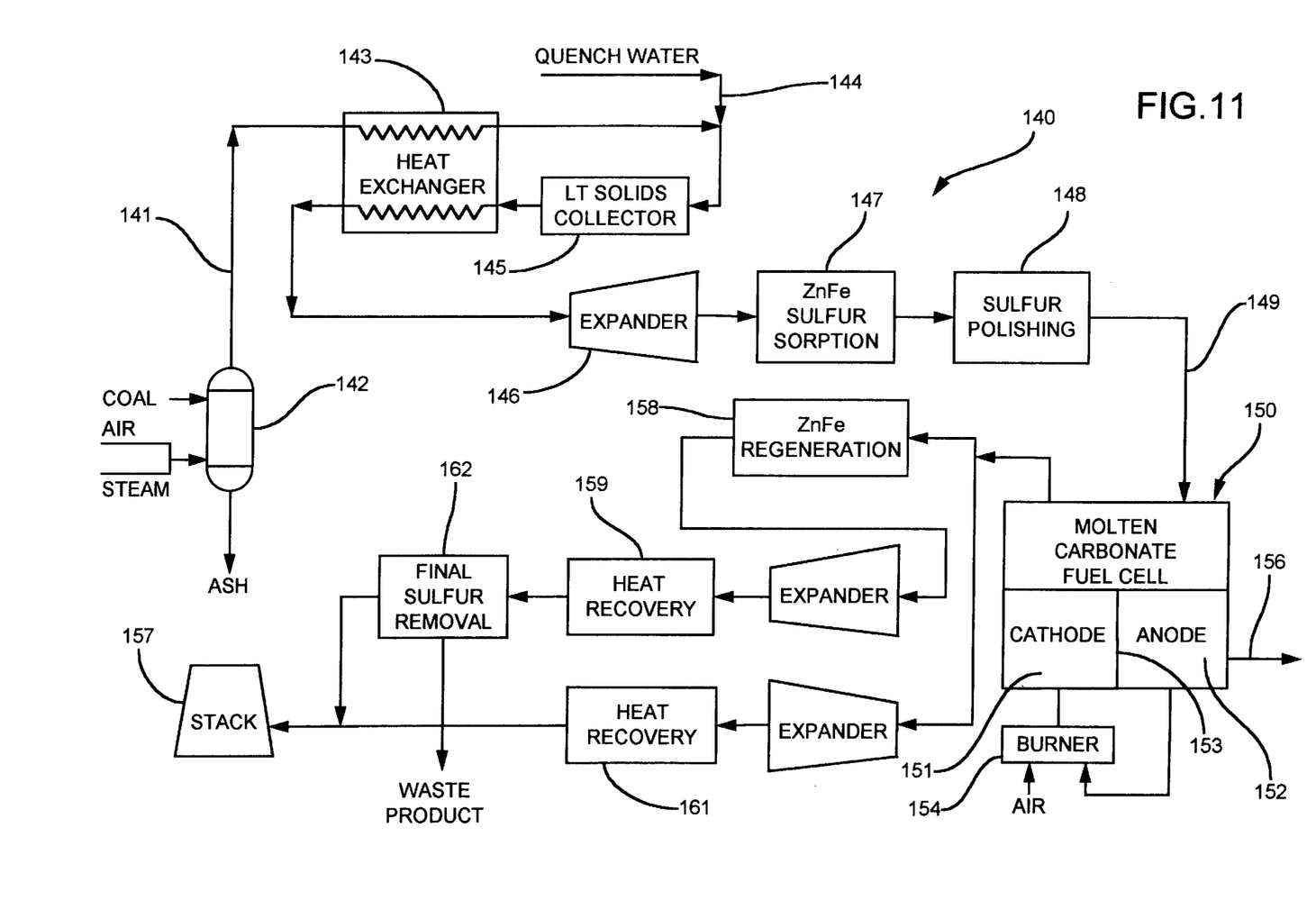
FIG. 11 is a schematic diagram of an alternative power generating gasification cycle as practiced in accordance with the present invention.

The system 140 shown in FIG. 11 features a molten carbonate fuel cell (MCFC) cycle. In the system 140, the fuel gas 141 from the gasifier 142 is cooled in the heat exchanger 143 and then cooled again by the injection of quench water at 144. Particulate solids and HAPs are removed from the cooled gas at 145 before the gas is reheated in the heat exchanger 143. During the treatment of the fuel gas prior to reheating of the fuel gas in heat exchanger 143, the fuel gas remains at a temperature exceeding the temperature at which liquid water forms in the fuel gas. Pressure of the gas stream is reduced in the expander 146 before it enters the ZnFe sulfur sorption system 147 and the sulfur polishing system 148. The clean gas at 149 is introduced to the molten carbonate fuel cell 150 which includes two electrodes, a cathode 151 and an anode 152 separated by an electrolyte 153. The clean fuel gas 149 is fed to the anode 152 where it is catalytically oxidized, while an oxidant (air) is fed to the cathode 151 through the burner 154 where it is catalytically reduced. Electrons liberated by the anode oxidation reaction are conducted through an outer circuit to the cathode for the reduction reaction. The electron flow through the outer circuit produces direct current electricity, shown at 156.

Before the gas leaves the system through the stack 157, energy from the gas leaving the cell 150 can be used for ZnFe regeneration at 158 in addition to the recovery of additional heat at 159, 161. The heat recovered 159, 161 can be used for process heat such as additional sulfur removal at 162 or the recovered heat can be used to run a steam turbine.

Figure 12:
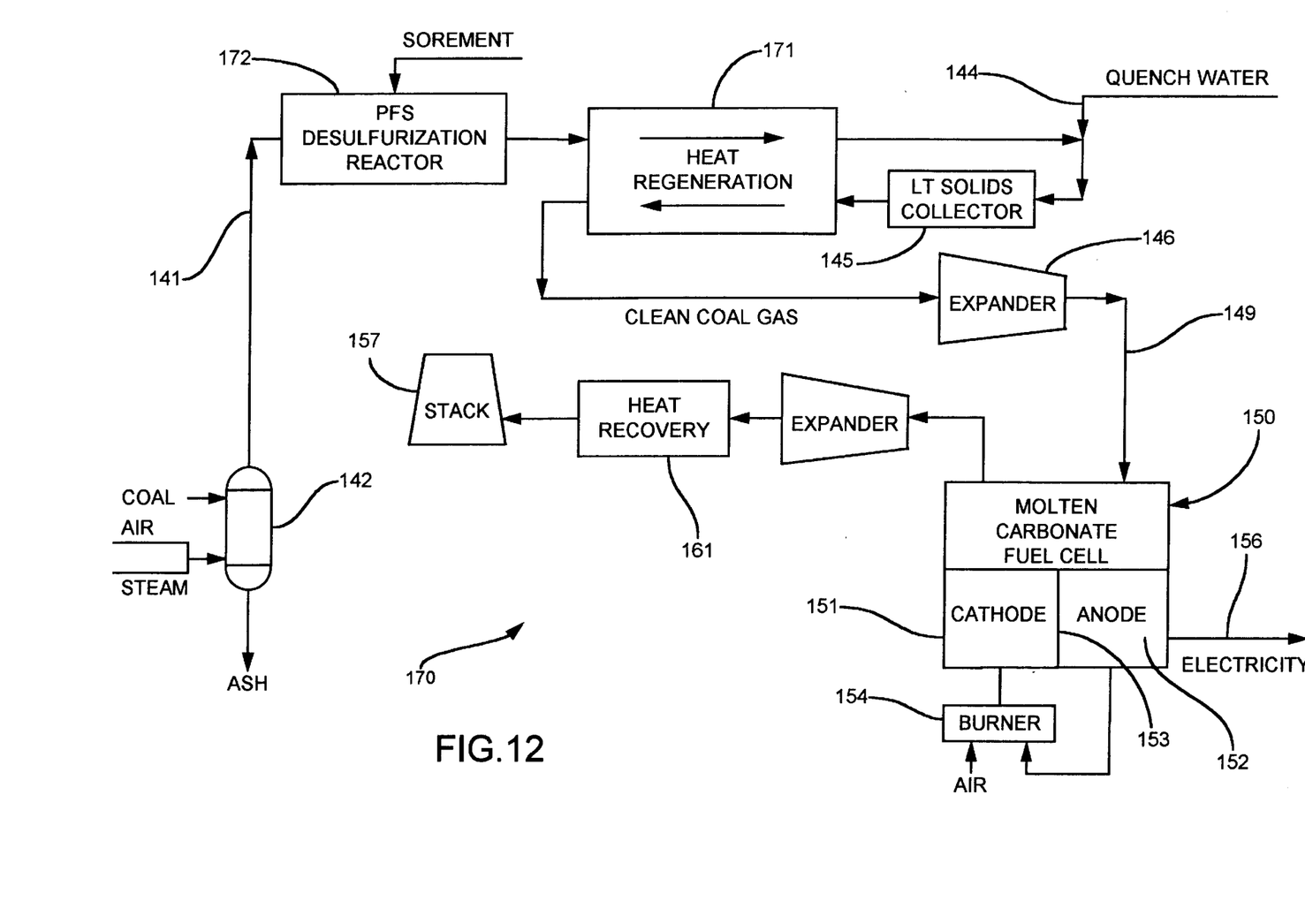
FIG. 12 is a schematic diagram of an alternative power generating gasification cycle as practiced in accordance with the present invention.

Turning now to FIG. 12, a system 170 is illustrated which employs a heat regenerator 171 as opposed to the heat exchanger 143 (see FIG. 11). Further, the system 170 as shown in FIG. 12 employs a pressurized fluidized bed reactor 172 as a desulfurization system instead of a ZnFe absorber 147 (see FIG. 11).

Figure 13A:
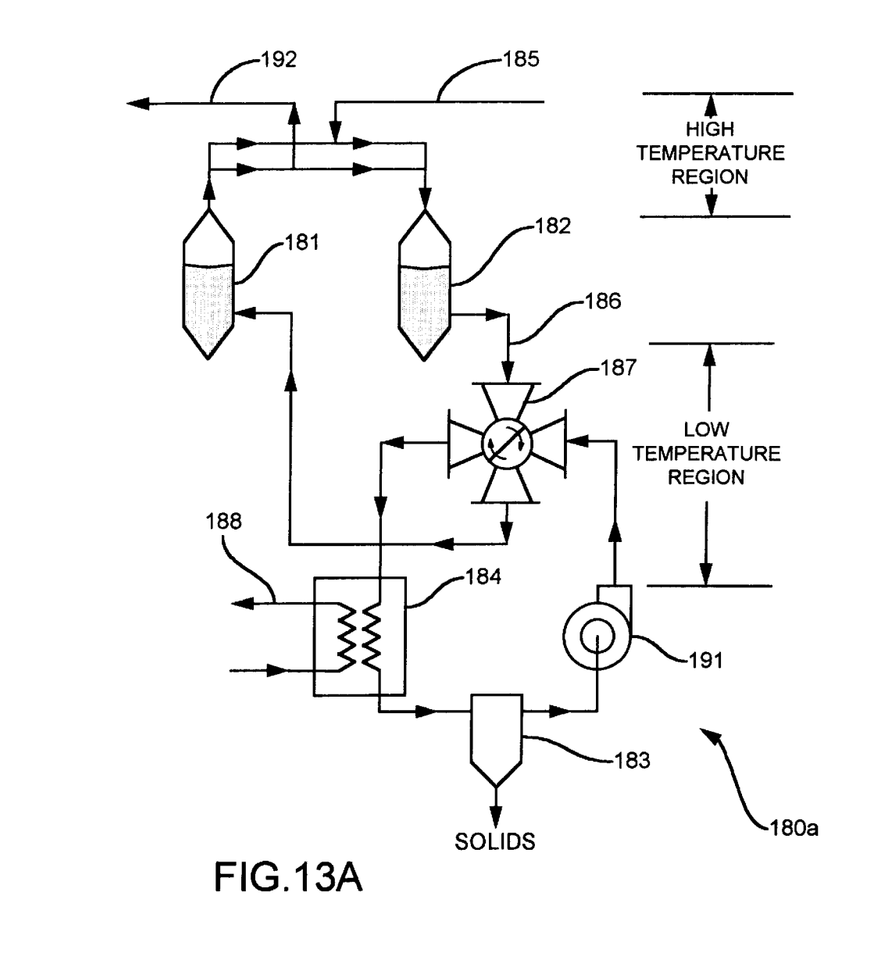
FIG. 13A is a partial schematic diagram of an alternative power generating gasification cycle as practiced in accordance with the present invention.
Figure 13B:
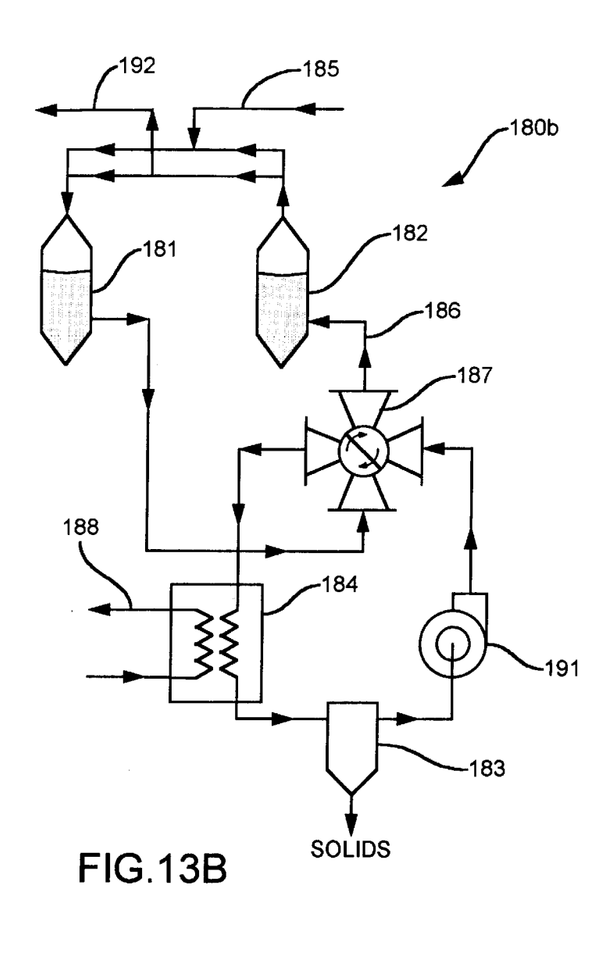
FIG. 13B is a partial schematic diagram of an alternative power generating gasification cycle as practiced in accordance with the present invention.

Some of the cycles discussed above employ heat regenerators (Hrs) as opposed to heat exchangers (see FIGS. 6, 8, 9, 10, and 12). FIGS. 13A and 13B illustrate the use of the heat regenerators 181 and 182 operating in conjunction with the low-temperature dry solids collector 183 and low-temperature auxiliary heat exchanger 184. Referring to the cycle 180a as illustrated in FIG. 13A, high-temperature contaminated gas enters the system 180a at the inlet 185 before the gas enters the right heat regenerator shown at 182. The hot gas then flows over solid material contained within the right heat regenerator 182 which absorbs heat from the gas. The gas then leaves the right heat regenerator 182 through the outlet shown at 186 before entering the rotary valve 187. In FIG. 13A, the gas is directed from the rotary valve 187 toward the auxiliary heat exchanger 184 where it is cooled by coolant 188 before entering the low-temperature dry solids collector at 183. Prior to and during treatment of the gas in the low-temperature dry solids collector 183, the gas remains at a temperature exceeding the temperature at which liquid water forms in the fuel gas. After solids have been removed from the gas at 183, the gas is pumped by the fan 191 through the rotary valve 187 and toward the left heat regenerator 181. The gas is heated in the left heat regenerator 181 before leaving the system through the conduit shown at 192. As shown below, the left heat regenerator 181 is heated during the cycle 180b as shown in FIG. 13B.

Referring now to FIG. 13B, the high-temperature gas enters the system at 185 and is directed downward through the left heat regenerator 181 before entering the rotary valve 187 which has been switched to direct the gas toward the heat exchanger 184 where it is cooled before entering the low-temperature dry solids collector 183. After the particulate solid matter has been removed at 183, the gas is pumped by the fan 191 through the rotary valve 187 which directs the gas through the right heat regenerator 182 which reheats the gas before it leaves the system at 192.

Thus, in FIG. 13A, the right heat regenerator 182 is heated by contaminated gas so it can heat clean gas in the cycle shown in FIG. 13B. In contrast, in FIG. 13B, the left heat regenerator 181 is heated by high-temperature gas so it can heat the clean gas in the cycle shown in FIG. 13A.

Systems which incorporate numerous parallel heat regenerator segments can be utilized which minimize outlet temperature fluctuations. Switching processes for different heat regenerator groups can be shifted in time with respect to one another. To operate parallel heat regenerator segments, several rotary valves with a single shaft or flow distributor with design principles similar to those used for pneumatic control systems or reciprocating pumps may be employed.

Figure 14:
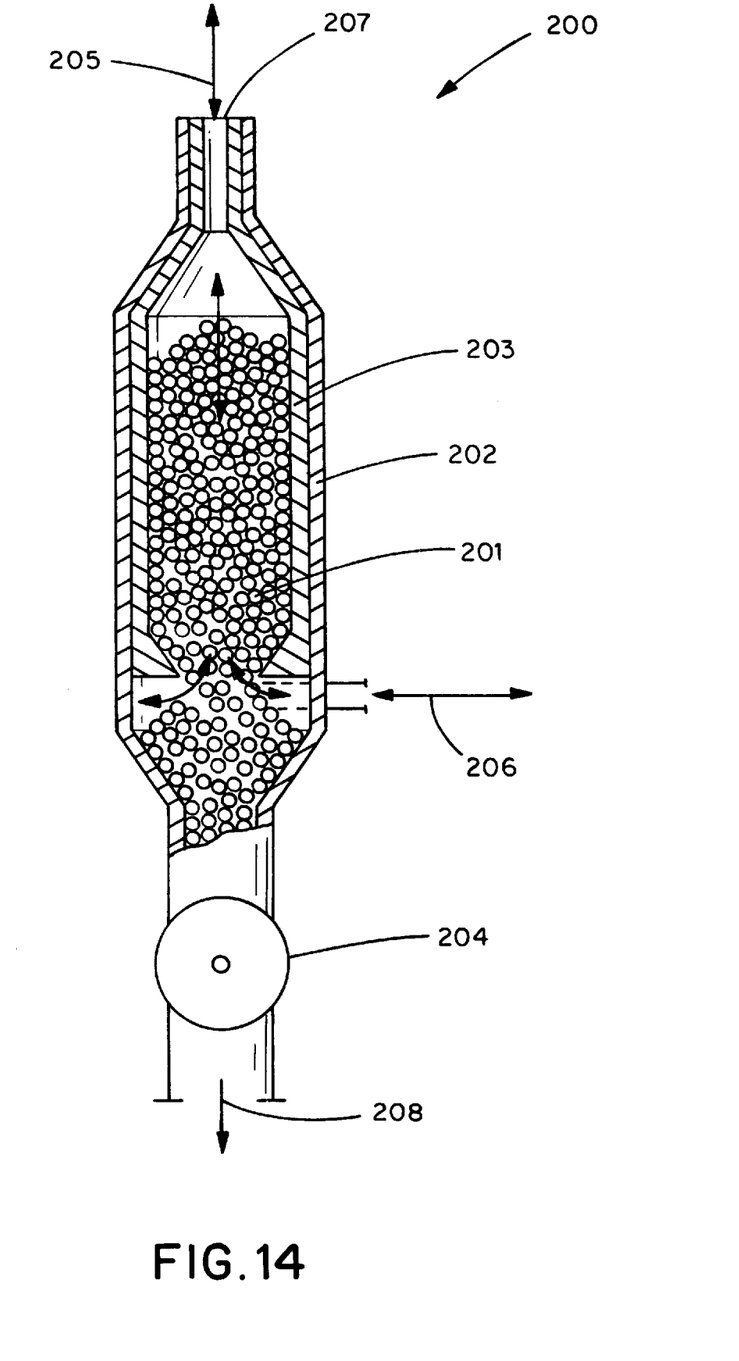
FIG. 14 is a schematic diagram of the power generating gasification cycle component as practiced in accordance with the present invention.

FIG. 14 illustrates the heat regenerator design 200 in more detail. The heat regenerator arranged as a packed bed 201 comprises the pressure vessel 202, insulation 203, and air lock 204. During a heating period for the heat regenerator, hot contaminated gas enters the heat regenerator at 205, and cooled contaminated gas leaves the heat regenerator at 206. During a cooling period for the heat regenerator, cooled clean gas enters the heat regenerator at 206, and hot clean gas leaves the heat regenerator at 205. The heat regenerator media, which may consist of granules, enters the heat regenerator at 207 and leaves the heat regenerator at 208. Sticky-type tar deposits can be removed from the heat regenerator together with the heat regenerator media, while loose-type deposits can be removed from the heat regenerator during normal cleaning procedures each time before switching the flow, without removing the media. The heat regenerator media surfaces may also be coated with a tar cracking catalyst.

Accordingly, an improved combined power generating gasification cycle has been provided in numerous applications which can utilize solid fuel in the form of gasified coal or biomass for electric power generation. No high-temperature particulate control system and no wet clean-up system is required. The combined power generating gasification cycle of the present invention employs components with lower technological risk, has low space and cost requirements, and provides low emission levels and high cycle efficiency as liquid water is not removed from the fuel gas in the system. As shown in the examples provided, the combined cycle of the present invention has many applications and may be incorporated into existing systems.

Although only selected designs and methods of the present invention have been illustrated and described, it will at once be apparent to those skilled in the art that variation may be made within the spirit and scope of the present invention. Accordingly, it is intended that the scope of the present invention be limited solely by the scope of the hereafter appended claims and not by any specific wording in the foregoing description.

We claim:

1. A method of generating power comprising the following steps:
    (a) converting solid fuel to a high-temperature high-pressure fuel gas in a gasifier, the fuel gas containing particulate solids and hazardous air pollutants;
    (b) cooling the fuel gas flow down to a first temperature exceeding the temperature at which liquid water forms in the fuel gas by passing it through a first heat-transfer system comprised of a packed bed heat regenerator including granules coated with a tar cracking catalyst;
    (c) cooling the fuel gas flow further down to a second temperature exceeding the temperature at which liquid water forms in the fuel gas;
    (d) removing the particulate solids and hazardous air pollutants from the fuel gas while simultaneously maintaining the temperature of the fuel gas flow above the temperature at which liquid water forms in the fuel gas;
    (e) reheating the fuel gas by passing it through the first heat-transfer system; and
    (f) generating power from the reheated fuel gas.

2. The method of claim 1 wherein the power generating step (f) is further characterized as:
    burning the reheated fuel gas in a gas turbine combustor to generate a combustion gas; and
    generating power by expanding the combustion gas from the gas turbine combustor in a gas turbine.

3. The method of claim 2 further comprising the following steps:
    (g) generating a steam flow by transferring heat from an exhaust gas flow from the gas turbine to feedwater of a bottoming cycle; and
    (h) generating additional power by expanding the steam flow in a steam turbine.

4. The method of generating power of claim 1, wherein step (d) is further characterized as passing the gas flow through a low-temperature dry solids collector.

5. The method of generating power of claim 1, wherein step (d) is further characterized as passing the fuel gas flow through an electrostatic precipitator.

6. The method of generating power of claim 1, wherein step (d) is further characterized as passing the fuel gas through a baghouse.

7. The method of generating power of claim 1, wherein step (d) is further characterized as passing the fuel gas flow through a barrier filter.

8. The method of generating power of claim 1, wherein tar cracking catalyst powder is injected in the fuel gas flow upstream of the heat regenerator.

* * * * *